United States Patent
Schiller et al.

(10) Patent No.: US 9,357,175 B2
(45) Date of Patent: May 31, 2016

(54) GENERATING AD INSERTION METADATA AT PROGRAM FILE LOAD TIME

(75) Inventors: Jay B. Schiller, Beaverton, OR (US); Joseph R. Matarese, Portland, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 2226 days.

(21) Appl. No.: 11/262,729

(22) Filed: Nov. 1, 2005

(65) Prior Publication Data

US 2007/0101359 A1    May 3, 2007

(51) Int. Cl.
| | |
|---|---|
| H04N 7/173 | (2011.01) |
| H04N 7/16 | (2011.01) |
| H04H 20/10 | (2008.01) |
| H04N 21/235 | (2011.01) |
| H04N 21/433 | (2011.01) |
| H04N 21/44 | (2011.01) |
| H04N 21/6543 | (2011.01) |
| H04N 21/81 | (2011.01) |
| H04N 7/025 | (2006.01) |
| H04H 60/06 | (2008.01) |
| H04H 60/73 | (2008.01) |

(52) U.S. Cl.
CPC ............. *H04N 7/165* (2013.01); *H04H 20/103* (2013.01); *H04N 21/2353* (2013.01); *H04N 21/4331* (2013.01); *H04N 21/44016* (2013.01); *H04N 21/6543* (2013.01); *H04N 21/812* (2013.01); *H04H 60/06* (2013.01); *H04H 60/73* (2013.01)

(58) Field of Classification Search
CPC ............ H04N 21/2312; H04N 21/232; H04N 21/234; H04N 21/23418; H04N 21/23424; H04N 21/235; H04N 21/2353; H04N 21/236; H04N 21/23617; H04N 21/25435; H04N 21/262; H04N 21/26241; H04N 21/26258; H04N 21/26275

USPC ......... 725/105, 32, 36, 91, 115, 116, 145, 88, 725/22; 370/414, 421, 444; 348/722
See application file for complete search history.

(56) References Cited

U.S. PATENT DOCUMENTS

| | | | | |
|---|---|---|---|---|
| 4,390,904 A | * | 6/1983 | Johnston .............. | G11B 27/024 358/908 |
| 5,283,639 A | * | 2/1994 | Esch et al. ...................... | 725/32 |
| 5,652,615 A | * | 7/1997 | Bryant et al. ................... | 725/35 |
| 5,892,535 A | * | 4/1999 | Allen et al. ...................... | 725/36 |
| 6,137,834 A | * | 10/2000 | Wine et al. ..................... | 375/240 |
| 6,477,707 B1 | * | 11/2002 | King et al. ....................... | 725/97 |
| 6,487,721 B1 | * | 11/2002 | Safadi ............................. | 725/36 |
| 6,546,556 B1 | * | 4/2003 | Kataoka ................. | H04N 7/088 348/465 |
| 7,222,155 B1 | * | 5/2007 | Gebhardt et al. ............. | 709/204 |
| 7,373,439 B2 | * | 5/2008 | Kimura ................ | H04N 21/235 375/E7.024 |

(Continued)

*Primary Examiner* — Pankaj Kumar
*Assistant Examiner* — Reuben M Brown
(74) *Attorney, Agent, or Firm* — Bart A. Perkins

(57) ABSTRACT

A method includes submitting one or more digital video program files for storage on behalf of one or more video servers; the act of submitting the video program files triggering logic to scan the program files to identify information about location and duration of ad breaks; storing the video program files and information about the location and duration of the ad breaks in a database external to the video program files in a manner that associates the video program files with corresponding information about the location and duration of the ad breaks, and in a manner that provides the video servers with access to both the video program files and information about the location and duration of the ad breaks; and removing the ad breaks from the video program files prior to streaming the video program files.

14 Claims, 4 Drawing Sheets

(56) References Cited

U.S. PATENT DOCUMENTS

| | | | |
|---|---|---|---|
| 7,530,086 B2* | 5/2009 | Brassil | 725/32 |
| 2002/0170071 A1* | 11/2002 | Parnell et al. | 725/130 |
| 2003/0005437 A1* | 1/2003 | Feuer et al. | 725/34 |
| 2003/0226150 A1* | 12/2003 | Berberet et al. | 725/94 |
| 2004/0158858 A1* | 8/2004 | Paxton et al. | 725/42 |
| 2004/0261100 A1* | 12/2004 | Huber et al. | 725/32 |
| 2005/0096978 A1* | 5/2005 | Black | 705/14 |
| 2006/0031892 A1* | 2/2006 | Cohen | 725/88 |
| 2006/0253864 A1* | 11/2006 | Easty | 725/35 |
| 2007/0055983 A1* | 3/2007 | Schiller et al. | 725/32 |
| 2007/0055984 A1* | 3/2007 | Schiller et al. | 725/32 |
| 2007/0064739 A1* | 3/2007 | Krishnamachari | 370/486 |
| 2007/0130581 A1* | 6/2007 | Del Sesto et al. | 725/36 |
| 2010/0095325 A1* | 4/2010 | Urdang et al. | 725/32 |

\* cited by examiner

US 9,357,175 B2

GENERATING AD INSERTION METADATA AT PROGRAM FILE LOAD TIME

TECHNICAL FIELD

The present disclosure relates to ad insertion in digital program content.

BACKGROUND

In present day cable television networks, programming content may be provided from various sources, including satellite broadcasts, upstream headend or control centers (e.g. via optical fiber), and from content storage facilities such as optical disks, magnetic disks, or even tape. In some situations the programming content may be loaded onto headend systems prior to distribution to subscribers. The headend systems may in turn provide the programming content as video and/or audio-on-demand.

Advertising may be inserted into the program content prior to the program content being delivered to subscriber systems. "Downstream" regional devices such as splicers and/or multiplexers may be applied in order to provide ad insertion into the program content. Downstream ad splicers/multiplexers tend to be complicated and expensive devices, and complicated and time-critical signaling may be involved between splicer/multiplexers and the video servers.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A method may include and/or involve submitting one or more digital program files for storage on behalf of one or more video servers, the act of submitting the program files triggering logic to scan the program files to identify information about location and duration of ad breaks, and storing the program files and information about the location and duration of the ad breaks in a manner that associates the program files with corresponding information about the location and duration of the ad breaks, and in a manner that provides the video servers with access to both the program files and information about the location and duration of the ad breaks; and/or ad selection and tracking systems with information about the location and duration of the ad breaks. The logic to scan the program files to identify information about location and duration of ad breaks may include and/or involve logic to identify cue packets in the program files and to apply the cue packets to generate metadata about ad break location and duration, and/or logic to identify the information about location and duration of ad breaks during processing to generate fast-scan information for the program files, and/or storing the information about the location and duration of the ad breaks in a video-server accessible database. The logic to identify cue packets in the program files and to apply the cue packets to generate metadata about ad break location and duration may include and/or involve logic to identify SCTE-35 cue packets.

The method may include and/or involve removing the information about location and duration of ad breaks from the digital program files. The removing the information about location and duration of ad breaks from the digital program files may include and/or involve removing cue packet information from the digital program files. It may include storing the ad content in the ad breaks of the digital program files or removing embedded ad content and storing the digital program files without the embedded ad content.

The method may include and/or involve determining advertising content to provide in association with the digital program files according to information of at least one order for the digital program files. The determining advertising content to provide in association with the digital program files according to information of at least one order for the digital program files may include and/or involve determining advertising content according to information of at least one subscriber placing the at least one order, and/or determining advertising content according to at least one of a time or times of day, day or days of the week and-or year, or one or more locations of subscribers placing the at least one order.

A video server may include and/or involve logic to stream one or more digital program files, and logic to apply, while streaming the program files, ad break information derived from the program files and stored prior to streaming the program files, and to stream advertising content for the program files at locations and for durations specified by the ad break information. The logic to apply, while streaming the program files, ad break information derived from the program files and stored prior to streaming the program files, and to stream advertising content for the program files at locations and for durations specified by the ad break information may include and/or involve logic to splice ad content into one or more program streams at locations and for durations indicated by the ad break information.

A system may include and/or involve one or more video servers, and logic to scan the program files to identify information about location and duration of ad breaks in response to loading the program files onto the video servers, and to store the program files on the video servers and to use one or more databases to associate the information about the location and duration of the ad breaks with corresponding program files. The logic to scan the program files to identify information about location and duration of ad breaks may include and/or involve logic to identify cue packets in the program files and to apply the cue packets to generate metadata about ad break location and duration, and/or logic to identify the information about location and duration of ad breaks during processing to generate fast-scan information for the program files. The logic to identify cue packets in the program files and to apply the cue packets to generate metadata about ad break location and duration may include and/or involve logic to identify SCTE-35 cue packets.

The system may include and/or involve one or more ad servers, and logic to select advertising to associate with a program file prior to receiving an order for the program file, and logic to stream the advertising during streaming of the program file in fulfillment of the order.

The system may include and/or involve logic to select advertising based upon at least one of demographics and-or location of a subscriber placing an order, and logic to stream the advertising during streaming of the program file in fulfillment of the order, where the advertising is streamed during the ad break for the duration of the ad break, possibly replacing advertising already embedded in the program file, and/or in front of and/or after the program file content.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functional

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Elements of a System to Provide Digital Program Insertion

Figure 1:
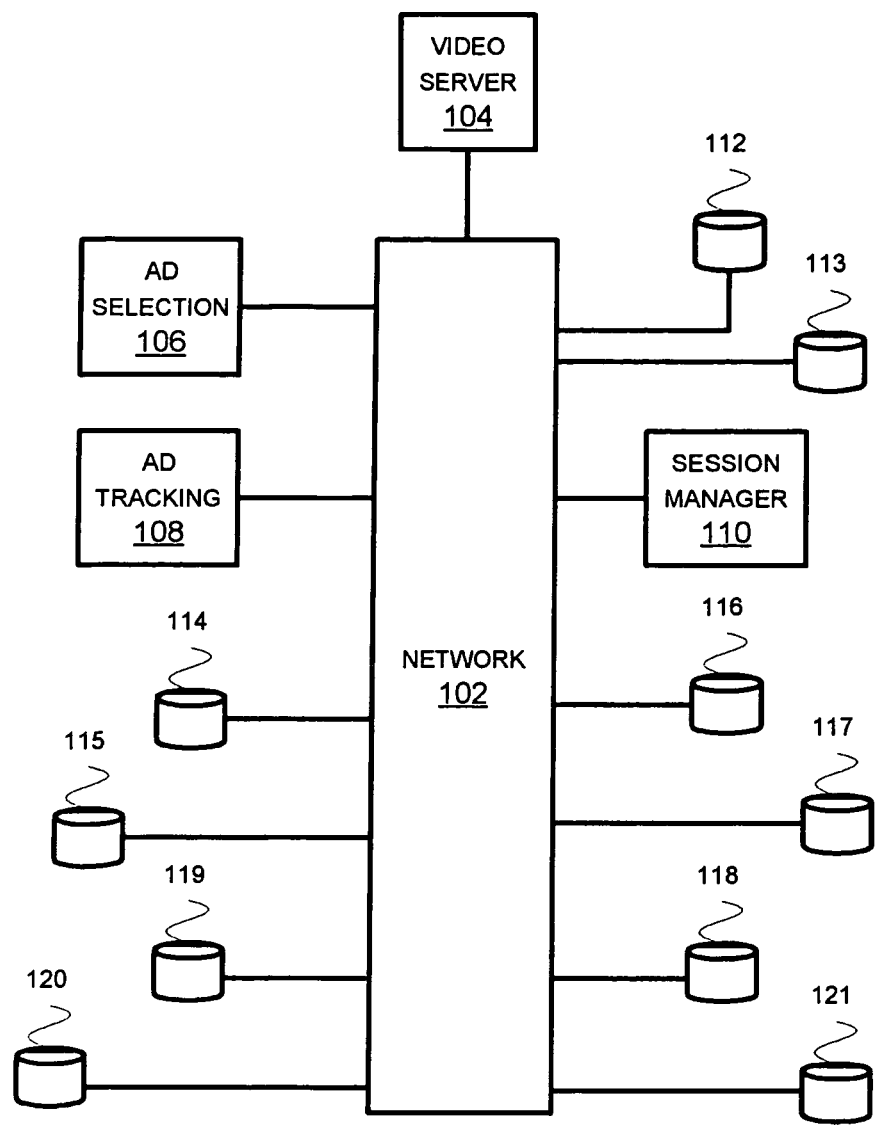
- FIG. 1 is a block diagram of an embodiment of elements of a system to provide digital program insertion.
Figure 2:
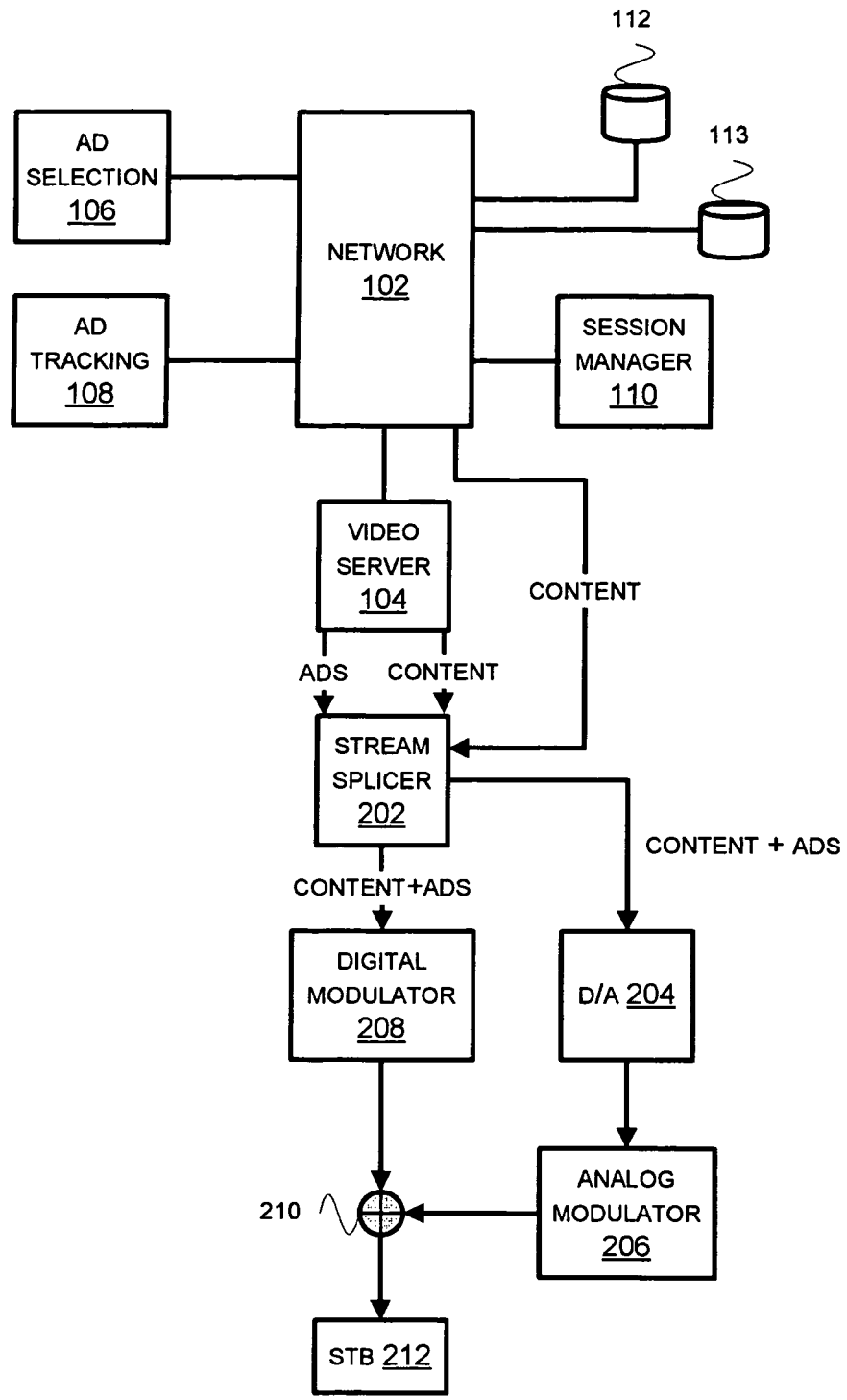
FIG. 2 is a block diagram of an embodiment of elements of a system to provide digital program insertion.
Figure 3:
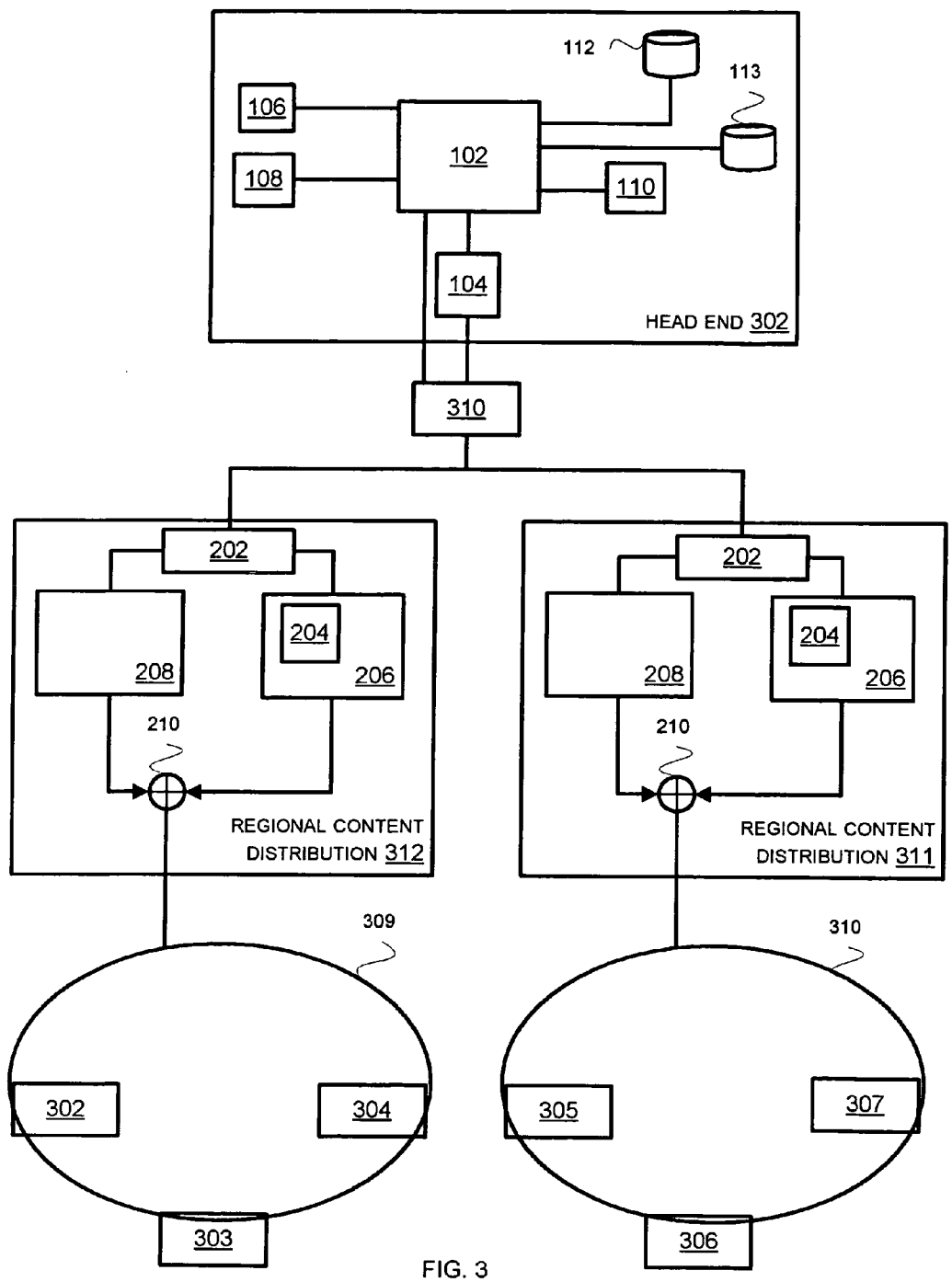
FIG. 3 is a block diagram of an embodiment of elements of a system to provide regionally-tailored digital program insertion.

FIG. 1 is a block diagram of an embodiment of elements of a system to provide digital program insertion. FIG. 1 omits various components that may be present in the headend system or may be located "downstream", e.g. closer to subscriber equipment in the content distribution system. An implementation of a distribution system including exemplary downstream components is illustrated in FIGS. 2-3. In some implementations, one or more of the downstream components illustrated in FIGS. 2-3 may be collocated with and/or comprised by headend systems.

Programming content 112 may be loaded onto the headend system from various sources, including satellite broadcasts, upstream headend or control centers (e.g. via optical fiber), and from content storage facilities such as optical disks, magnetic disks, or even tape. By "loaded onto the headend system" it is meant that the program content 112 is stored in a manner that makes it accessible for streaming by one or more video servers of the headend system.

The headend system may in turn provide the programming content 112 as video and/or audio-on-demand (henceforth, the term 'video-on-demand' may refer to programming content comprising video, audio, or a combination thereof).

A data network 102 enables communication between various system components. The data network 102, which may include one or more Gigabit Ethernet switches, optical switches, or other high performance devices, may provide high-speed, high-throughput communications. In some situations, the data network 102 may include only communications and/or switching logic and modulators. Although the data network 102 is shown as a primary mechanism of communication between certain system components, in some situations some of the system components may communicate directly or using other mechanisms.

The system includes one or more video servers 104, which may stream the programming content 112. The video server 104 may also stream ad content 113 for insertion into and/or association with the programming content 112. In some situations, ad content 113 and programming content 112 may be streamed by different video servers. The programming content 112 and ad content 113 may be stored in a manner that makes them accessible to the video server 104, e.g. via mass storage accessible via the data network 102 and/or integrated into the video server and/or other devices and/or systems accessible via the data network. In some implementations, the video server 104 may itself store the programming content 112 and/or ad content 113.

The program content 112 may be streamed in response to video-on-demand orders for the program content 112. Endpoint devices, such as set top boxes (STBs) or other subscriber equipment, may receive and decode the streamed program content.

Program content may include embedded advertising intended to reach the entire audience of the program, and indications, called cues, of locations in the stream where local or system wide advertising may be inserted, called ad breaks. When an ad break is for local content, it may be called a local ad break. Ad selection 106 logic may be invoked to select one or more ads to insert at one or more ad breaks. In some cases, the ad selection logic 106 may be incorporated as part of one or more video servers 104. Programming content 112 and ad content 113 may both be streamed during local ad breaks, with the ad content "spliced" into the program content at the appropriate times and/or places.

Load-Time Ad Break Analysis

One or more digital program files may be submitted for storage on behalf of one or more video servers. The digital program files may be submitted in various fashions, including via satellite broadcasts, upstream headend or control centers (e.g. via optical fiber), and from content storage facilities such as optical disks, magnetic disks, or even tape. The act of submitting the program files may trigger logic to scan the program files to identify information about location and duration of ad breaks. Alternatively, this scanning may be performed prior to submitting the program files for storage.

The program files and information about the location and duration of the ad breaks (a.k.a. ad break metadata) may be stored in a manner that associates the program files with corresponding information about the location and duration of the ad breaks, and in a manner that provides the video servers with access to both the program files and information about the location and duration of the ad breaks. One manner of providing such storage is using one or more databases. The ad break metadata may be stored along with the programming content 112, the ad content 113, data about the ad content (a.k.a. ad content metadata) and/or elsewhere in the system and/or external to the system.

The logic to scan the program files to identify information about location and duration of ad breaks, a.k.a. program scanning logic, may identify cue packets in the program files and apply the cue packets to generate metadata about ad break location and duration. In some implementations, the program scanning logic may identify SCTE-35 cue packets.

The program scanning logic may identify the information about location and duration of ad breaks during processing to generate fast-scan information for the program files. For example, the programming content may be scanned to generate metadata and/or additional files to support fast forward and/or rewind. This scan may also be used to generate ad break metadata such as information on the location and duration of ad breaks.

Program files and ad break metadata and/or ad content metadata may be stored in a manner that associates the program files with corresponding information about the location and duration of the ad breaks. This process may be referred to herein as "program storage". Program storage may involve storing the information about the location and duration of the ad breaks in one or more video-server accessible databases. The database(s) may be distinct from or a part of database(s) where the programming content 112 is stored. The database(s) may be distinct from or a part of a database where the ad content 113 and/or ad content metadata is stored. The storing of programming content, ad break metadata, ad content metadata, and ad content may be accomplished in a manner supports one or more of association of ad and program files when the program content is loaded, when it is ordered, and/or when it is streamed.

In some implementations ad selection and/or insertion may take place during program storage. In other situations ad selection and/or insertion may take place at or near a time or times when the program content is streamed. In still other situations, selection and/or insertion may take place at or near a time or times of the ad break(s) during streaming of the program content.

Advertising may also be selected and/or inserted at the time or times that programming content 112 is selected for viewing (e.g. in video-on-demand environments).

In some situations, information about location and duration of ad breaks may be removed from the digital program files. This may involve removing ad break/cue packet information from the digital program files. Once cue packet information has been removed, further processing of the program file may not recognize that there was an ad break at that point. Therefore, downstream ad splicers may not attempt to obtain and insert advertising. One situation where ad break removal may occur is when content is streaming and an ad break is detected, but no suitable ads are available. For example, if all ads which could otherwise be selected specify as a selection criterion a minimum number of viewers, and that viewing threshold is not met, no ads may be selected and/or inserted. In some cases, an ad break may be targeted for local ad content, and no local ad content may be available for some portion of the viewing audience.

Ad Selection and Tracking

The ad selector 106 may select zero, one, or multiple ads to insert at the ad break. Ad breaks in program content may be identified in various fashions, including using SCTE 35 cue packets (e.g. with MPEG formatted program content), using digitized DTMF tones, as commonly understood by one skilled in the art, and possibly using other means as well. Often, ad breaks occur near the beginning and end of program content, and sometimes at other times/places as well. The ad selector 106 may identify ads for inserting by applying one or more ad schedules 115. Ad schedules 115 may provide information such as what days an ad is to play, at what times or how often during the day the ad is to play, how many ad exposures the ad should receive when played, types of content that the ad should be associated with, a channel or channels the ad should play on, a region or regions that should be exposed to the ad, the target demographics for the ads, on what channels the ad is to play, with what programming content the ad is to play, and so on. At least some of the information included in an ad schedule 115 may represent time slots, program slots, and so forth that have been committed to one or more ad time purchasers. In some situations, for some ads, the ad schedule 115 may be inflexible. In other situations, for some ads, the ad schedule 115 may vary and/or adapt over time according to various dynamic factors.

The ad selector 106 may interpret ad metadata 121 during the ad selection process. Ad metadata 121 may include information such as what is being sold and the demographics for the target audience for the ad. For example, ad metadata for an ad for video games may identify the target audience as young men from age eighteen to age twenty-six.

The ad selector 106 may apply ad exposure information 114. The ad exposure information 114 may be derived from an ad log which includes items such as when the ad ran, on what channels, and so forth. It may also include information which could be used to gauge ad effectiveness. Such information may include items such as how many households were in the area(s) receiving the ad and/or which households were tuned to the programs comprising the ad.

The ad selector 106 may access various information sources in order to select ads for insertion into content streams that most effectively satisfy the requirements of the ad time purchasers. The ad selector 106 may apply regional information 120 when selecting ads. For example, a certain number of set top boxes may be served by a regional quadrature amplitude modulator (QAM) that is passing a particular program.

A regional QAM is a type of and/or component of a regional node used to deliver content to a particular parts of the distribution network, such as subscriber equipment in one or more geographic and/or market areas.

In some situations, the ad selector 106 may apply information provided by the session manager 110 to the selection of an ad. One function of the session manager 110 may be to receive and process subscriber video-on-demand order requests, and/or channel tune requests. A subscriber placing an order and/or tuning a channel may be associated with a particular regional QAM. The subscriber may also be associated, via a subscriber database, with one or more regions, areas, and/or neighborhoods having demographic characteristics. Such demographics may include income distribution information for the residents, family size, viewer age information, dwelling sizes, information about businesses and/or employers for the residents of the neighborhood, and the like. The ad selector 106 may apply such demographics to the selection of an appropriate ad for insertion into one or more program streams.

The ad selector 106 may also or alternatively apply demographic information 117 from sources external to the content delivery provider, such as the U.S. census bureau or third-party information providers.

An example use of an external source would be the ad selector 106 directly querying an external information source while performing the ad selection function. That external source could be available over the Internet or via another communication mechanism, such as satellite. For example, the ad selector may provide a query or otherwise initiate an information search, using an Internet search engine or other location function, to obtain information about a household and/or individual(s) associated with subscriber equipment providing a program/channel request.

The ad selector 106 may obtain identification information for particular endpoint devices (subscriber equipment) providing requests for programs/channels for which ad insertion is to occur. For example, the ad selector 106 may obtain such information from the session manager 110, and may apply the information to locate subscriber information 116 associated with the endpoint devices. The subscriber information 116 may include, for example, the subscriber's interests, purchase history, and past viewing habits. Special attention may be provided to ensuring the subscriber's privacy. For example, if a subscriber is tuned to the fishing channel five hours a day, and fishing equipment is the subject of an ad, the ad there may provide a good match for a program the subscriber is watching, even if the program is not on the fishing channel. In some cases, third party information such as the credit rating of the subscriber may also be applied, although again, special attention should be paid to privacy concerns.

The ad selector 106 may also apply channel information 119 during the ad selection process. An example of channel information 119 is the typical percentage of married couples watching the Discovery Channel™ on weekday evenings. Married couples might be considered as good targets for household appliance or car ads, but they would probably be considered poor targets for purchase of dating club memberships.

The ad selector 106 may apply program information 118 during the ad selection process. For example, a program may be categorized as "foreign travelogue" and may be typically watched by individuals from age thirty-five to fifty-five having an upper-middle class income level. The ad selector 106 may determine that such a program is a poor match for an ad for an air combat video game. However, if the subject of the ad is a game on travel trivia designed for high-end mobile phones, the ad selector 106 may determine that the ad content and the program are a suitable match.

The ad tracker 108 may update ad exposure information 114 with information about exposure for an inserted ad. Exposure information 114 may include information about which ads were included in which programs, on which channels, and at which times. Ad exposure information 114 may also include information about which regions were exposed to which ads, which endpoint devices were tuned to the programs in which the ads were inserted, and so on. In many situations, the client who purchased the ad time may desire to know not only that the purchase conditions were satisfied (i.e. the ad did run when promised) but also information as to how effective the ad was (i.e., information such as how many active viewers were tuned to the program and/or channel when the ad ran, and/or information about those viewers such as their demographics). The ad tracker 108 and the ad selector 106 may cooperate to capture and record such information.

Elements of the system may be combined in various ways. For example, ad selection 106, ad tracking 108, the session manager 110, and other logic may be incorporated in a video server or servers 104 or in one or more other processing devices. The various programming 112 and ad 113 content and other databases 114-121 may be accessible through one database or server component or through several. Some or all of the data 112-121 may be duplicated on permanent storage or in permanent or temporary caches.

Elements of a System to Provide Digital Program Insertion

FIG. 2 is a block diagram of an embodiment of elements of a system to provide digital program insertion.

The system of FIG. 2 includes the data network 102, ad selection 106, ad tracking 108, the session manager 110, and the program content 112 and ad content 113. The ad selector 106 selects ad content for streaming by one or more video servers 104 at ad break location(s) in the program content 112. In some situations, different video servers may stream the digital program and the ad content to insert therein. The video server 104 may inform the ad selector 106 and/or ad tracking 108 that that the ad was successfully inserted.

A digital output stream comprising program content with ads inserted therein may be created by a stream splicer 202. Those skilled in the art will appreciate that in some embodiments, the video server 104 may comprise the ad splicer 202 functionality. The program stream with inserted ads may be delivered to both a digital modulator 208 (for example, a QAM modulator), and to a digital to analog (D/A) converter 204 for processing of the stream into an analog representation prior to analog modulation 206. In some situations, analog and digital representations of the stream may be aggregated 210 and communicated to endpoint devices such as a set top box 212. In some cases, the QAM 208 may perform the functions of recognizing the ad breaks and inserting the ads into the program stream and/or aggregating program streams.

In some situations, at least some of the endpoint devices may comprise set-top boxes 212, ODAs, and/or VNIUs (video network interface units) providing digital to analog conversion and/or analog modulation at or near the subscriber premises. In such situations it may be possible to do without one or more of the network D/As 204, analog modulators 206, and/or combining network. In most situations, the program stream with inserted advertising may be aggregated with other program and/or ad streams as a digital multicast, prior to modulation in what is known to one skilled in the art as a combining network. The modulator 208 may receive a multicast comprising many programs, and may only pass to region(s) it serves those digital programs that are presently being tuned by endpoint devices in the region. This may act to conserve bandwidth in the regional distribution network, which may be important in switched broadcast networks where both analog and digital representations of programs are communicated on the regional distribution networks.

Applying Ad Break Metadata to Streamed Program Content

The video server 104 may include logic to stream one or more digital program files, and logic to apply, while streaming the program files, ad break information derived from the program files and stored prior to streaming the program files, and to stream advertising content for the program files at locations and for durations specified by the ad break information (a.k.a. ad insertion logic).

The ad insertion logic may operate to splice ad content into one or more program streams at locations and for durations indicated by the ad break information. Inserted ad content may replace ad content previously embedded at the ad break. Ad insertion may be accomplished by indicating that the Package Identifier (PID, the stream content sub identifier) to be used is that of the ad content rather than that of the program content. (Set-top-boxes may use PIDs to recognize which set of packets within the combined program/ad stream to render to the television.).

One or more video servers may include logic to scan the program files to identify information about location and duration of ad breaks in response to loading the program files onto the video servers, and to store the program files on the video servers and to use one or more databases to associate the information about the location and duration of the ad breaks with corresponding program files.

A media distribution system may include one or more ad servers having logic to select advertising to associate with a program file prior to receiving an order for the program file, and logic to stream the advertising during streaming of the program file in fulfillment of the order. Advertising may be selected at least in part based upon at least one of demographics and-or location of a subscriber placing an order, and logic to stream the advertising during streaming of the program file in fulfillment of the order.

Elements of a System to Provide Regionally-Tailored Digital Program Insertion

FIG. 3 is a block diagram of an embodiment of elements of a system to provide regionally-tailored digital program insertion. A head end 302 of the video distribution system may include and/or involve one or more communication interfaces to regional distribution nodes 311 and 312. Two regional nodes 311 312 and a single head end 302 are shown for purposes of discussion; in practice, any practical number may be present.

The head end 302 may include an interface to a high speed switch 310, such as a gigabit-class Ethernet switch. Two switches or additional or different communications equipment may be used to accomplish communications between the head end 302 and the regional distribution networks 311, 312. The head end 302 may employ the video server 104 to provide streamed content to the switch 310, and may also provide routing information to direct the content to the appropriate regional node(s). There may be other communications interfaces such as a communication interface between the data network 102 of the head end 302 and the switch 310 as well as interfaces not shown.

The regional distribution nodes 311 and 312 each serve content through a regional distribution plant to various endpoint devices 302-307 typically located on or near subscriber premises. To accomplish this, they may at times communicate information such as a program/channel request generated by subscriber equipment 302-307 upstream through the switch 310 to the session manager application 110, which may service the request. System components 102, 104, 106, 108, 110, 112, 113 202, 204, 206, 208, and 210 may be as described in FIGS. 1 and 2. Again, those skilled in the art will appreciate that in some embodiments, the video server 104 may comprise the ad splicer 202 functionality.

Ad Selection and Tracking

The system may include logic to select one or more ads for insertion into streamed video content at least in part according to information about which of the regional distribution nodes 312 313 are and/or will be distributing content into which the one or more regional ads are to be embedded.

Ads may be selected at least in part according to characteristics of the content with which to associate the ads. The logic 106 to select one or more ads to stream at least in part according to characteristics of the content with which to associate the ads may include and/or involve logic to select one or more ads at least in part according to at least one of a category, genre, actor, theme, plot, target audience, or other attribute of the content.

One or more ads may be selected at least in part according to the demographic profile of the channel on which the ad would play. For example, a channel with a demographic profile of 75% young males between the ages of sixteen and thirty might be considered an attractive place to advertise a used car business. A channel with a demographic profile of 50% retired people in the hours between 6 pm and 12 pm might be considered an attractive place to run ads for recreational vehicles.

One or more advertisements may be selected at least in part according to one or more of a time of day, a day of the week, a season, or a date. The system may include logic 106 to analyze, weigh, and/or rank two or more of the various factors applied to select ad candidates in order to rank the ad candidates and/or select the most attractive candidate. For example, an ad advertising a used car lot may be a good fit from the perspective of channel demographics (mostly young males) and neighborhood demographics (working class, the target buyers for used cars) but a poor fit on program content (a gardening show). A second ad (advertising an area nursery) may be a good fit on program content but a poor fit on neighborhood demographics (mostly apartment buildings).

The logic 108 may operate to update one or more ad exposure records (e.g. one or more ad logs) at least in part according to information about which of one or more regional modulators 208 are passing, will be passing, and/or have passed content with which the one or more ads are associated. The ad exposure records may also be updated according to information about which subscribers ordered video-on-demand, tuned a channel, and so on. Recording of ad exposure indications may be skipped when the information about the regional modulators 208 and/or subscribers is applied to indicate that insufficient exposure resulted for the one or more ads selected for streaming.

Recorded ad exposure information for the selected one or more ads may include an indication of a region or regions served by the one or more regional modulators 208 which passed the content with which the one or more ads are associated, and/or information about subscribers exposed to the ads.

Recorded ad exposure information may include information indicating which regional distribution nodes 312 311, and/or component or components thereof, is distributing, will be distributing, and/or did distribute the content into which the one or more regional ads are to be embedded. Factors used by the ad selector to select one or more ads for insertion may also be recorded.

The system may obtain the information uses for ad selection from internal sources, such as information on regional viewing characteristics, and/or which subscribers are currently watching a particular program and/or channel. This information may be obtained, for example, by correlating information about which set top boxes are tuned to which programs and/or channels with information on which subscribers use those set top boxes, and/or using information about which subscribers ordered video-on-demand. In some situations such information may be obtained from set top box program/channel tuning requests to the session manager 110, where an identification is made of one or more regional nodes 311 312 and/or components thereof (such as an associated digital modulator 208) serving the set top boxes.

The system may also obtain information used in ad selection from third party sources, such as the U.S. census bureau or a credit bureau, and/or via Internet queries.

Generating and Storing Ad Break Metadata for Digital Program Files

Figure 4:
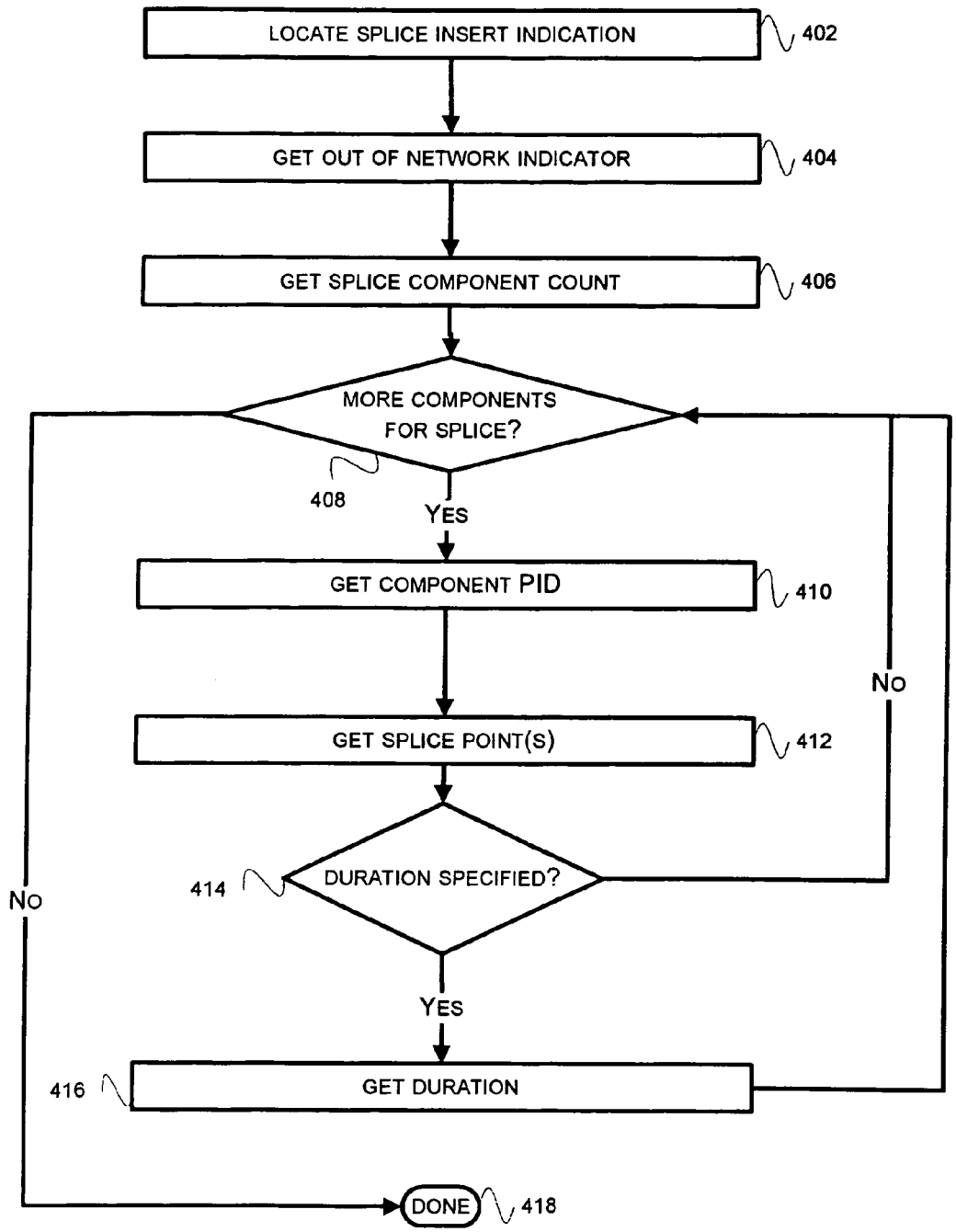
FIG. 4 is a flow chart of an embodiment of a process of generating and storing ad break metadata for digital program files.

FIG. 4 is a flow chart of an embodiment of a process of generating and storing ad break metadata for digital program files. The logic to generate and store ad break metadata may be exercised in conjunction with the logic to prepare the programming content to support fast forward and fast rewind capability (e.g. fast scan), and/or regular speed and slow forward/rewind. In some embodiments, the scanning of the programming content to generate ad break metadata and support fast forward/rewind will occur close to the time of or during program storage. This may be done in conjunction with making the programming content available to the video server for streaming.

To generate ad break metadata, the program stream may be scanned for ad break information, and the ad break information may be saved as metadata (e.g. data generated from the ad break information, describing the ad break information) separate from and/or in one or more data packets and/or referenced in a header of the program stream file(s)). At 402, a splice insert indication is identified in the program stream. An example of such an indication would be an SCTE-35 cue packet indicated by a "splice command type" field having a value of "splice insert". At 402, the out-of-network indicator is read from the SCTE 35 command. The out-of-network indicator contains data relevant to the nature of the ad break. It may indicate that the splice will be implemented using a start time and duration. Alternatively, it may indicate the splice will be implemented using a start time (out point indication) and stop time (in point indication). An indication may be obtained from the program stream as to whether the ad break is for the program stream as a whole (a.k.a. a "program splice"), or one or more components thereof. Components of a digital program stream may include streams for audio, video, auxiliary data, control information, and so on. Components are distinguished within the program stream by a package identifier (PID).

In this example the ad break may indicate component replacement. Thus, at 406 a splice components count is read. A count of 1 or 2 may be typical values. If 1, for example, only the audio stream or the video stream might be replaced during the ad break. A second example of 1 would be where a ticker or information running at the bottom of a program (which would be identified as an auxiliary data PIED) was replaced with ad content information. If 2, for example, both the video and audio stream might be replaced, but not the ticker. In many situations a "program splice" may indicate that the ad content replaces all components of the program content (or previously embedded ad content) during the ad break. In such cases, information for the ad break might not be broken down on a component basis.

At 408, if there are more components to splice, the process proceeds to 410.

At 410, the component PID is retrieved. At 412, the splice point information is retrieved, e.g. in an SCTE 35 message the pts time field adjusted by the pts adjustment field. At 414, it is determined whether the splice specifies a duration. For example, the duration flag of an SCTE 35 command may be examined for this purpose. Also, the out of network indicator field may provide guidance as to whether duration will be specified. At 416, if a duration is specified, duration information is retrieved, e.g. by reading the duration field of the SCTE 35 command.

At 418, component splice information has been obtained for all components to be replaced by the ad break, and the process concludes.

The obtained information may be written to metadata describing the ad break. The metadata may be applied during ad insertion, for example as described herein. Ad insertion may be performed by the video server and/or by a separate downstream stream splicer. Ad insertion may take place during streaming of the program content, at or close to the time when set top boxes or other terminal devices are to receive and/or render the program content. In general, ad insertion may take place at any time before the time when set top boxes or other terminal devices are to render the program content.

The ad break metadata could, in some situations, be provided by the video server or other system component to the splicing component (either external to or comprised by the video server) at any point prior to the time when the ad(s) should be inserted. The splicing component may then apply the ad break metadata and request the ad content for splicing into the program content at the appropriate time.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method comprising:
   submitting one or more video program file comprising an ad break for storage by one or more video server;
   the act of submitting the video program file for storage by the video server triggering logic to scan the video program file to identify information about a location of the ad break and a duration of the ad break in the video program file;
   storing the video program file and information about the location of the ad break and the duration of the ad break in a database external to the video program file in a manner that provides the video server with access to both the video program file and the location of the ad break and the duration of the ad break;
   associating the video program file with the location of the ad break and the duration of the ad break in the database external to the video program file;
   removing the ad break from the video program file prior to streaming the video program file from the video server; and
   wherein the logic to scan the video program file identifies the location of the ad break and the duration of the ad break during generation of fast-scan information for fast forward or rewind of the video program file.

2. The method of claim 1, wherein the logic to scan the video program file further comprises:
   logic to identify a cue packet in the video program file and to apply the cue packet to generate metadata describing the location of the ad break and the duration of the ad break.

3. The method of claim 2, wherein the logic to identify the cue packet in the video program file further comprises:
   logic to identify an SCTE-35 cue packet.

4. The method of claim 1, wherein removing the location of the ad break and the duration of the ad break from the video program file further comprises:
   removing a cue packet from the video program file.

5. The method of claim 1, further comprising:
   determining advertising content to provide in association with the video program file according to information of at least one order for the video program file.

6. The method of claim 5, wherein determining the advertising content further comprises:
   determining the advertising content according to information about at least one subscriber placing the order for the video program file.

7. The method of claim 5, wherein determining the advertising content further comprises:
   determining the advertising content according to at least one of a time or times of day, day or days of a week and-or year, or one or more locations of at least one subscriber placing the order for the video program file.

8. A video server comprising:
   machine memory and one or more circuits comprising logic to stream one or more video program files;
   machine memory or circuits comprising logic to apply, while streaming the video program file, ad break information derived from the video program file and stored in a database external to the video program file prior to streaming the video program file, and to stream advertising content for the video program file at an ad break location and for an ad break duration defined by the ad break information, and to remove the ad break information from the video program file prior to streaming the video program file,
   machine memory or circuits comprising logic to submit one or more video program file comprising an ad break for storage by one or more video server; and
   machine memory or circuits comprising logic to scan the video program file to identify the ad break information configured to operate when the video program file is stored on a video server and to identify the ad break information and the ad break duration during processing to generate fast-scan information for fast forward or rewind of the video program file.

9. The video server of claim 8, comprising:
   logic to control a splice of the advertising content into the video program file at the ad break location.

10. A system comprising:
    one or more video server for streaming at least one video program file comprising an ad break;
    machine memory or circuits comprising logic to scan the video program file to identify an ad break location and an ad break duration, the logic to scan the video program file triggered by loading of the video program file onto the video server for storage by the video server;
    logic to store the video program file on the video server and to operate one or more database external to the video program file to associate the ad break location and the ad break duration with the video program file, and to remove the ad break from the video program file prior to streaming the video program file; and
    wherein the logic to scan the video program file identifies the ad break location and the ad break duration during processing to generate fast-scan information for fast forward or rewind of the video program file.

11. The system of claim 10, further comprising:
    logic to identify a cue packet in the video program file and to apply the cue packet to generate metadata describing the ad break location and the ad break duration.

12. The system of claim 11, wherein the cue packet is an SCTE-35 cue packet.

13. The system of claim 10, further comprising: one or more ad server;
  logic to select advertising to associate with the video program file prior to receiving an order for the video program file; and
  logic to stream the advertising during streaming of the video program file in fulfillment of an order for the video program file.

14. The system of claim 10, further comprising:
  logic to select advertising based upon at least one of demographics and-or location of a subscriber placing an order for the video program file; and
  logic to stream the advertising during streaming of the video program file in fulfillment of the order.

* * * * *